United States Patent
Heo et al.

(10) Patent No.: US 9,851,779 B2
(45) Date of Patent: Dec. 26, 2017

(54) METHOD AND APPARATUS FOR CONTROLLING SLEEP MODE USING A LOW POWER PROCESSOR IN PORTABLE TERMINAL

(71) Applicant: Samsung Electronics Co. Ltd., Suwon-si, Gyeonggi-do (KR)

(72) Inventors: Changryong Heo, Suwon-si (KR); Kenhyung Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 225 days.

(21) Appl. No.: 13/933,596

(22) Filed: Jul. 2, 2013

(65) Prior Publication Data

US 2014/0013141 A1    Jan. 9, 2014

(30) Foreign Application Priority Data

Jul. 3, 2012 (KR) .................. 10-2012-0072239

(51) Int. Cl.
*G06F 1/00* (2006.01)
*G06F 1/32* (2006.01)
*H04W 52/02* (2009.01)

(52) U.S. Cl.
CPC .......... *G06F 1/3293* (2013.01); *G06F 1/3215* (2013.01); *H04W 52/027* (2013.01); *H04W 52/028* (2013.01); *H04W 52/0254* (2013.01); *H04W 52/0293* (2013.01); *Y02B 60/121* (2013.01); *Y02B 60/50* (2013.01)

(58) Field of Classification Search
CPC .... G06F 1/3203; G06F 1/3287; G06F 1/3293; G06F 21/552; G06F 2221/2107; G06F 3/017; H04M 2250/12; H04M 1/72569; H04W 52/0254; H04W 52/0251
See application file for complete search history.

(56) References Cited

U.S. PATENT DOCUMENTS

| | | | |
|---|---|---|---|
| 9,063,574 B1 * | 6/2015 | Ivanchenko | ............ G06F 3/017 |
| 9,094,539 B1 * | 7/2015 | Noble | ....................... H04N 7/00 |
| 9,176,608 B1 * | 11/2015 | Baldwin | .................. G09G 5/00 |
| 2003/0040339 A1 * | 2/2003 | Chang | ................... H04M 1/667 |
| | | | 455/563 |
| 2004/0073818 A1 * | 4/2004 | Cheok et al. | ................. 713/300 |
| 2007/0028761 A1 | 2/2007 | Schrader et al. | |

(Continued)

FOREIGN PATENT DOCUMENTS

| | | |
|---|---|---|
| EP | 2434368 A1 | 3/2012 |
| KR | 10-2011-0007177 A | 1/2011 |

(Continued)

*Primary Examiner* — Thomas Lee
*Assistant Examiner* — Zhipeng Wang
(74) *Attorney, Agent, or Firm* — Jefferson IP Law, LLP

(57) ABSTRACT

A method and an apparatus for controlling a sleep mode in a portable terminal having a main controller and a sub-controller operating at low power are provided. The method includes detecting, by the sub-controller, a first sensor signal generated by a first sensor when the main controller is in the sleep mode, extracting a sensed pattern from the detected first sensor signal, determining whether the extracted sensed pattern is substantially identical with a preset wake-up pattern, and cancelling the sleep mode by waking-up the main controller when the extracted sensed pattern is substantially identical with the wake-up pattern.

16 Claims, 5 Drawing Sheets

(56) References Cited

U.S. PATENT DOCUMENTS

| | | | |
|---|---|---|---|
| 2007/0079161 A1 | 4/2007 | Gupta | |
| 2008/0220829 A1 | 9/2008 | Akama et al. | |
| 2009/0135751 A1 | 5/2009 | Hodges et al. | |
| 2009/0259865 A1 | 10/2009 | Sheynblat et al. | |
| 2010/0070776 A1* | 3/2010 | Raman | G06F 21/552 |
| | | | 713/189 |
| 2010/0157057 A1* | 6/2010 | Lim | H04N 7/18 |
| | | | 348/148 |
| 2010/0313050 A1* | 12/2010 | Harrat | G06F 1/3203 |
| | | | 713/323 |
| 2011/0093727 A1 | 4/2011 | Hwang | |
| 2011/0095975 A1* | 4/2011 | Hwang | G06F 1/1626 |
| | | | 345/156 |
| 2011/0205186 A1* | 8/2011 | Newton | G06F 3/011 |
| | | | 345/175 |
| 2012/0081392 A1* | 4/2012 | Arthur | H04N 5/23222 |
| | | | 345/633 |
| 2012/0154303 A1 | 6/2012 | Lazaridis et al. | |
| 2012/0159218 A1 | 6/2012 | Vangala et al. | |
| 2013/0009875 A1* | 1/2013 | Fry | G06F 3/0304 |
| | | | 345/168 |
| 2013/0099757 A1* | 4/2013 | Ham | H02J 7/0047 |
| | | | 320/150 |
| 2013/0159750 A1* | 6/2013 | Branover et al. | 713/323 |
| 2014/0013417 A1* | 1/2014 | Sakai et al. | 726/16 |
| 2014/0118257 A1* | 5/2014 | Baldwin | G06F 3/017 |
| | | | 345/158 |
| 2014/0152551 A1* | 6/2014 | Mueller | G06F 3/017 |
| | | | 345/156 |

FOREIGN PATENT DOCUMENTS

| | | |
|---|---|---|
| WO | 2008-136551 A1 | 11/2008 |
| WO | 2010-141878 A1 | 12/2010 |
| WO | 2011-034351 A2 | 3/2011 |

* cited by examiner

METHOD AND APPARATUS FOR CONTROLLING SLEEP MODE USING A LOW POWER PROCESSOR IN PORTABLE TERMINAL

PRIORITY

This application claims the benefit under 35 U.S.C. §119(a) of a Korean patent application filed on Jul. 3, 2012 in the Korean Intellectual Property Office and assigned Serial No. 10-2012-0072239, the entire disclosure of which is hereby incorporated by reference.

BACKGROUND OF THE INVENTION

1. Field of the Invention

The present invention relates to a method and an apparatus for controlling a sleep mode. More particularly, the present invention relates to a method and an apparatus for controlling a sleep mode capable of controlling cancellation of the sleep mode using a low power processor.

2. Description of the Related Art

In recent years, with the significant development of information and communication technology and a semiconductor technology, supply and use of all types of mobile terminals and/or portable terminals has rapidly increased. The portable terminal provides various functions, such as a call function, a music playback function, a character message transceiving function, a digital broadcasting reception function, a near field wireless communication function, and an Internet connection function.

Meanwhile, the portable terminal uses a battery for portability. Due to use of the battery, schemes for reducing current consumption, or in other words, power consumption, are being focused on in a field of portable terminals. In order to reduce current consumption, when a portable terminal according to the related art is not used, the portable terminal operates in a low power mode, that is, a sleep mode. If a wake-up event is generated, the portable terminal operating in the sleep mode cancels, i.e., terminates or exits, the sleep mode and operates in an active mode. For example, the wake-up event may be a key signal input from a physical key input unit. When the physical key input is needed, the user may inconveniently perform the physical key input. For example, when both hands are dirty, the user may inconveniently wash their hands in order to perform the physical key input. In order to address the problem, in recent years, a scheme of cancelling a sleep mode of the portable terminal through motion or voice without key input has been considered. However, in order to cancel a sleep mode of the portable terminal using the motion or voice, a main controller such as an Application Processor (AP) should maintain an active state or be periodically woken-up. This results in an increase of current consumption in the portable terminal and thus, reduces an amount of power stored in the battery of the portable terminal.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method of controlling a sleep mode of a portable terminal by monitoring generation of a wake-up event in a sleep mode using a low power processor, and an apparatus thereof.

In accordance with an aspect of the present invention, a method of controlling a sleep mode in a portable terminal having a main controller and a sub-controller operating at low power is provided. The method includes detecting, by the sub-controller, a first sensor signal generated by a first sensor when the main controller is in the sleep mode, extracting a sensed pattern from the detected first sensor signal, determining whether the extracted sensed pattern is substantially identical with a preset wake-up pattern, and cancelling the sleep mode by waking-up the main controller when the extracted sensed pattern is substantially identical with the wake-up pattern.

In accordance with another aspect of the present invention, an apparatus for controlling a sleep mode in a portable terminal is provided. The apparatus includes a main controller requesting entering the sleep mode, a first sensor detecting a first sensor signal when the main controller is in the sleep mode, and a sub-controller operating at low power, the sub-controller being activated to extract a sensed pattern from the first sensor signal detected by the first sensor when the main controller is in the sleep mode and waking-up the main controller when the extracted sensed pattern is substantially identical with a preset wake-up pattern.

In accordance with another aspect of the present invention, a method of controlling a sleep mode in a portable terminal having a main controller and a sub-controller operating at low power is provided. The method includes activating the sub-controller when the main controller enters the sleep mode, collecting, by the sub-controller, sensor information for at least one of surrounding situation information of the portable terminal and state information of the portable terminal, determining whether the collected sensor information satisfies a preset alarm condition, waking-up the main controller when the alarm condition is satisfied, limiting some functions of the portable terminal, and storing the collected sensor information in a protected area which user is not able to access or delete.

Another aspect of the invention provides a computer program comprising instructions arranged, when executed, to implement a method in accordance with any one of the above-described aspects. A further aspect provides machine-readable storage storing such a program.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Meanwhile, although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

Prior to a detailed description, a portable terminal according to present exemplary embodiments of the present invention is a terminal providing a low power mode, such as a sleep mode, wherein the terminal may be a mobile communication terminal, a smart phone, a tablet PC, a hand-held PC, a Portable Multimedia Player (PMP), a Personal Digital Assistant (PDA) or any other similar and/or suitable portable electronic device.

Figure 1:
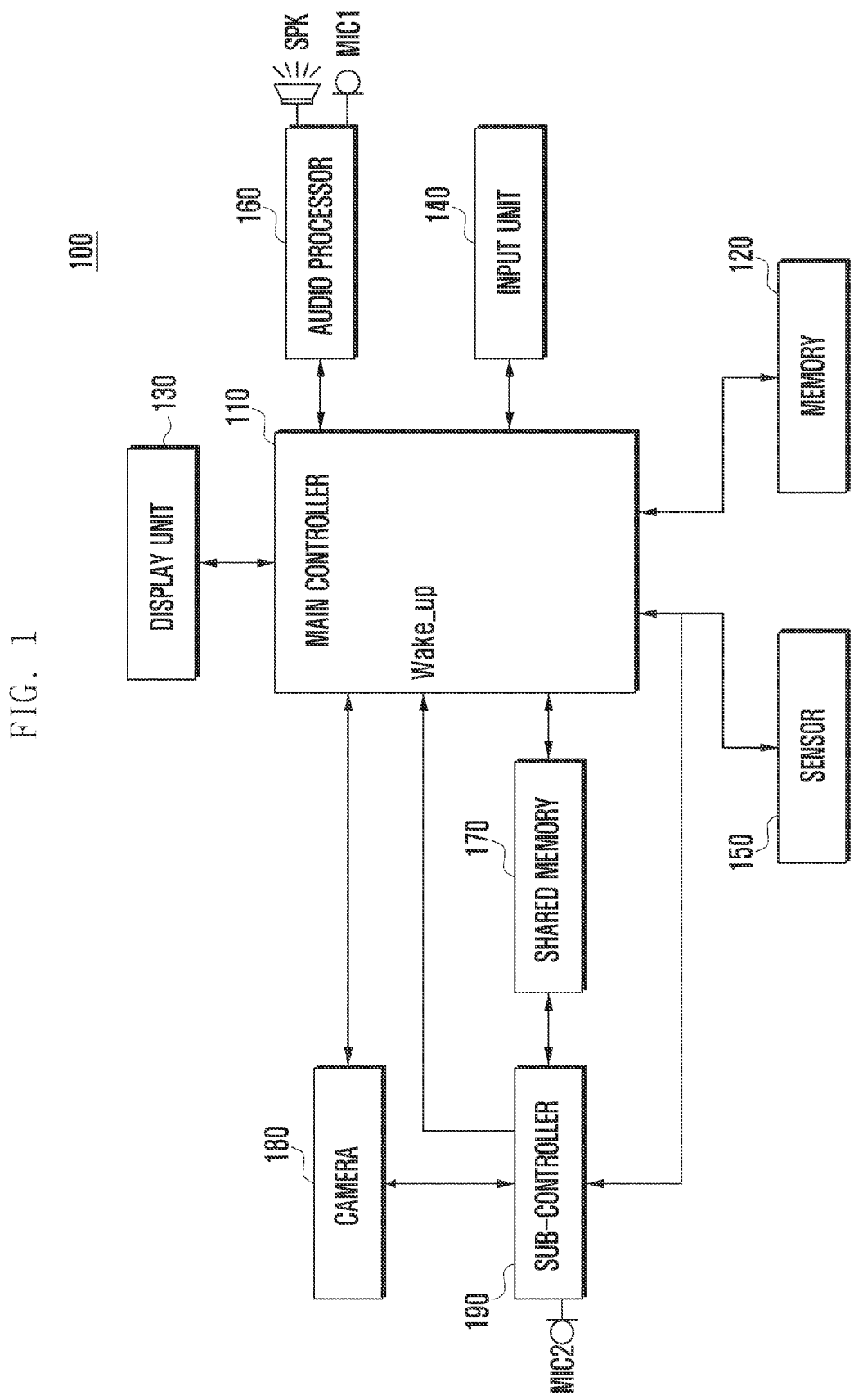
FIG. 1 is a block diagram schematically illustrating a configuration of a portable terminal according to an exemplary embodiment of the present invention.

FIG. 1 is a block diagram schematically illustrating a configuration of a portable terminal according to an exemplary embodiment of the present invention.

Referring to FIG. 1, a portable terminal 100 may include a main controller 110, a sub-controller 190, a camera 180, a shared memory 170, an audio processor 160, a sensor 150, an input unit 140, a display unit 130, and a memory 120.

The input unit 140 may include a plurality of input keys and function keys for receiving numerical and character information, and for setting various functions. The function keys may include arrow keys, side keys, and hot keys corresponding to performing respective functions and/or operations. Further, the input unit 140 generates a key signal associated with a user setting and function control of the portable terminal 100 and transfers the generated key signal to the main controller 110. The key signal may include a power on/off signal, a volume control signal, a screen on/off signal and any other similar and/or suitable signal for executing operations of the portable terminal 100. Moreover, the input unit 140 may be configured by one of input means such as a Qwerty key pad including a plurality of keys, a 3*4 key pad, a 4*3 key pad, a Ball Joystick, an Optical Joystick, a Wheel Key, a Touch key, a Touch Pad, a Touch screen, a combination thereof or any other similar and/or suitable input means. In addition, when the portable terminal 100 supports a full touch screen, the input unit 140 may include only a volume key for controlling a volume which is formed on a side of a case of the portable terminal 100, and a power key for a screen on/off operation and a portable terminal on/off operation.

The display unit 130 displays information input by a user and/or information provided to the user as well as various menus of the portable terminal 100. That is, the display unit 130 may provide various screens according to use of the portable terminal 100, for example, a home screen, a menu screen, a message creation screen, a call screen, a schedule management screen, an address book screen, a web page output screen, or any other similar and/or suitable screen that may be displayed by the display unit 130 of the portable terminal 100. When the portable terminal 100 enters a sleep mode, the display unit 130 is turned-off. When the portable terminal 100 cancels, i.e., exits or terminates, the sleep mode, the display unit 130 is turned-on. Particularly, the display unit 130, according to the present exemplary embodiment, may display an alarm message reporting a dangerous situation under control of the main controller 110. The display unit 130 may be a Liquid Crystal Display (LCD), a Light Emitting Diode (LED) display, an Organic LED (OLED) display or any other similar and/or suitable type of display device. When the display unit 130 is a touch screen, the display unit 130 may provide functions of an input unit (not shown).

The camera 180 captures a picture of a subject and may convert the subject into an electrical image signal. The camera 180 may be implemented by a Complementary Metal Oxide Semiconductor (CMOS) scheme, a Charge Coupled Device (CCD) scheme or any other similar and/or suitable scheme. The camera 180 will be apparent to those skilled in the art to which the present invention pertains, and thus a detailed description thereof will be omitted. Particularly, the camera 180 according to the present invention may be connected to the main controller 110 and the sub-controller 190. In detail, the camera 180 is connected to the main controller 110 through a High Speed Interface, for example, a Mobile Industry Processor Interface (MIPI), a Mobile Display Digital Interface (MDDI), or any other similar and/or suitable interface, in an active mode. The camera 180 may be connected to the sub-controller 190 through a Low Speed Interface, for example, an Inter-Integrated Circuit (I2C), a Serial Peripheral Interconnect (SPI), or any other similar and/or suitable interface, in a sleep mode.

The camera 180 may be activated in the sleep mode and recognize motion and/or movement of a user. For example, the camera 180 may transmit an input preview image to the sub-controller 190. In this case, the sub-controller 190 may compare preview images to recognize motion of a specific subject or object of the user, e.g., a finger and/or a hand of a user or a stylus held by a user. In this case, the camera 180 may activate only some of all pixels of the camera 180. That is, the camera 180 may activate only some pixels in the sleep mode and may be driven to detect the motion of the user and an image of a low resolution. Conversely, the camera 180 may activate all pixels in an active mode and may be driven to detect an image of a high resolution, e.g., for camera operation of the portable terminal 100. Accordingly, the present exemplary embodiment may reduce current consumption in the sleep mode. That is, since not all pixels of the camera 180 are needed to detect the motion of the user, the present exemplary embodiment may activate only some pixels to reduce current consumption in the sleep mode.

The pixels of the camera 180 may refer to a plurality of photosensor elements or other image sensor elements comprised by the camera 180. Activating only some of pixels therefore refers to activating only a subset of the plurality of image sensor elements.

The audio processor 160 may include a speaker SPK for outputting sound corresponding to audio data, such as audio data received during a call, such as a voice call and/or a video call, audio data included in a received message, and audio data according to playback of an audio file stored in the memory 120. The audio processor 160 may also include a first microphone MIC1 for collecting a voice of a user or other audio signals during the call or during other operations of the portable terminal. Particularly, the audio processor 160 according to the present exemplary embodiment may output an alarm effect sound reporting that a dangerous situation is detected in the sleep mode through the speaker SPK.

The sensor 150 may detect a surrounding situation and state, such as a pause or not, of the portable terminal 100. The sensor 150 may transmit a sensor value corresponding to the surrounding situation and state of the portable terminal 100 to the sub-controller 190 in the sleep mode. Also, the sensor 150 may transmit a sensor value corresponding to the surrounding situation and state of the portable terminal 100 to the main controller 110 in the active mode. To this end, the sensor 150 may include an accelerometer sensor, a motion sensor, a geomagnetic sensor, a temperature sensor, a humidity sensor, an atmospheric pressure sensor, a pressure sensor, a gravity sensor, a vision sensor, or any other similar and/or suitable sensor that may be included in the portable terminal 100. Meanwhile, although FIG. 1 illustrates that the sensor 150 is connected to both the sub-controller 190 and the main controller 110, the present invention is not limited thereto. That is, in a portable terminal according to another exemplary embodiment of the present invention, the sensor 150 may be connected to the sub-controller 190 in the sleep mode. Further, the portable terminal according to another exemplary embodiment of the present invention may further include a switch (not shown) switched so that the sensor 150 is connected to the main controller 110 in the active mode.

The memory 120 may store an Operating System (OS) of the portable terminal 100, an application program for other functions, for example, a sound playback function, an image or moving image playback function, a broadcasting playback function, or any other similar and/or suitable function, and may also store user data, data transmitted and/or received during communication operations or other operations of the portable terminal 100, and any other similar and/or suitable data that may be stored on the portable terminal 100. For example, the memory 120 may store a moving image file, a game file, a music file, and a movie file. Particularly, the memory 120, according to the present exemplary embodiment, may store a motion wake-up pattern, a sound wake-up pattern, and an alarm condition. The motion wake-up pattern may include a pattern where a subject, e.g., a hand or a pen, is moved from a left side to a right side of the portable terminal 100, a pattern where the subject is moved from the right side to the left side of the portable terminal 100, a pattern where the subject is moved from the left side to the right side and is then moved from the right side to the left side of the portable terminal 100, a pattern where the subject is moved from a lower side to an upper side of the portable terminal 100, a pattern where the subject is moved from the upper side to the lower side of the portable terminal 100, a pattern where the subject is again moved from the lower side to the upper side of the portable terminal 100, and a pattern where the subject is moved according to a predetermined figure, such as a circle, a triangle, a star, or any other similar and/or suitable figure shape. Such motion wake-up patterns may be set by the user or may be predetermined according to a manufacturer or design preference.

In the same manner, the sound wake-up pattern may be variously set by the user or may be predetermined according to a manufacturer or design preference. The alarm condition may include at least one reference value for determining a situation where the portable terminal 100 may be damaged or the user may be in a dangerous situation and/or state with respect to the portable terminal 100. For example, the alarm condition may include a high temperature reference value, e.g., 70° C., a low temperature reference value, e.g., −5° C., a humidity reference value, e.g., 70%, and a reference value, e.g., an acceleration value, for determining free fall of the portable terminal 100 or a sudden movement and/or stopping of movement by the user. When the portable terminal 100 enters the sleep mode, the motion wake-up pattern, the sound wake-up pattern, and the alarm condition may be transmitted to the sub-controller 190, and may be stored in an area which the sub-controller 190 may access.

The main controller 110 controls overall operation of the portable terminal 100 and signal flow between internal blocks and/or elements of the portable terminal 100, and may perform a data processing function of processing data. For example, the main controller 110 may include a Central Processing Unit (CPU) and an Application Processor (AP). Particularly, when entering or starting of the sleep mode is requested, the main controller 110 may activate the sub-controller 190 and may enter the sleep mode. If a wake-up signal is input from the sub-controller 190 in the sleep mode, then the main controller 110 may be woken-up. To this end, the main controller 110 may receive a wake-up signal through an interrupt port, such as a Wake-up interrupt port.

When the sleep mode is cancelled, i.e., terminated or exited, due to detection of a dangerous situation of the portable terminal 100, the main controller 110 may report a corresponding alarm. For example, the main controller 110 may report the alarm through at least one of displaying an alarm message on the display unit 130, outputting an alarm effect sound through the speaker SPK of the audio processor 160, and generating vibration through a vibration motor (not shown). Further, when the sleep mode is cancelled due to the detection of the dangerous situation of the portable terminal 100, then the main controller 110 may limit some functions of the portable terminal 100 or may control the portable terminal 100 to turn the power of the portable terminal 100 off. This is performed in order to prevent damage or failure by stabilizing the portable terminal 100. Further, when the sleep mode is cancelled due to detection of the dangerous situation, then the main controller 110 may store sensor information detected in the dangerous situation. The main controller 110 may store the sensor information in an area of the memory 120 or any other area of the portable terminal 100 which the user may not approach or delete.

When the portable terminal 100 enters the sleep mode, the sub-controller 190 may be activated and may control cancellation of the sleep mode. The sub-controller 190 may be configured by a Micro-Processor Unit (MPU) or a Micro-Controller Unit (MCU), which are a low power processor type. For example, the sub-controller 190 may monitor generation of a wake-up signal through detection of a motion signal, a sound signal, and a sensor signal.

In detail, the sub-controller 190 may extract a motion pattern from image data input from the camera 180. To this end, the sub-controller 190 may include a motion pattern extraction function which extracts the motion pattern by analyzing image data. Next, the sub-controller 190 may compare the extracted motion pattern with a stored motion wake-up pattern. When the extracted motion pattern is substantially the same as the motion wake-up pattern, then the sub-controller 190 may transmit a wake-up signal to the main controller 110. In this case, the sub-controller 190 may directly transmit the wake-up signal to an interrupt port Wake-up of the main controller 110.

Further, the sub-controller 190 may include an Analog-Digital Converter (ADC) converting an analog signal input through a second microphone MIC2 into a digital signal and an amplifier. In addition, the sub-controller 190 may extract a sound pattern by analyzing the digital signal. The sub-controller 190 may compare the extracted sound pattern with a stored sound wake-up pattern. When the extracted sound pattern is identical with the sound wake-up pattern, the sub-controller 190 may transmit the wake-up signal to the main controller 110. Further, the sub-controller 190 may receive a sensor signal from the sensor 190 and may determine whether the sensor signal satisfies a stored alarm condition. When the received sensor signal satisfies the alarm condition, then the sub-controller 190 may transmit the wake-up signal to the main controller 110. In this case, the sub-controller 190 may transmit sensor information to the main controller 110. In addition, the sub-controller 190 may store the sensor information in an area which the user may not approach, access or delete.

The shared memory 170 serves as a medium and/or element to exchange data between the sub-controller 190 and the main controller 110. A Dual Ported Random Access Memory (RAM) (DPRAM), or any other similar and/or suitable type of storage medium, may be used for the shared memory 170. When the sub-controller 190 may directly communicate with the main controller 110, then the shared memory 170 may be omitted.

In the meantime, FIG. 1 illustrates that two microphones, that is, the first microphone MIC1 and the second microphone MIC2 are included, but the present invention is not limited thereto. That is, the portable terminal according to another exemplary embodiment of the present invention may include one microphone MIC and a switch (not shown) which connects the microphone MIC to the sub-controller 190 in the sleep mode and connects the microphone MIC to the audio processor 160 in the active mode.

Further, although not shown in FIG. 1, the portable terminal 100 may selectively further include constituent elements having additional functions such as a Global Positioning System (GPS) module for receiving location information, a broadcasting receiving module for receiving broadcasting, a digital sound source playback module such as a digital audio module, an Internet communication module for performing an Internet function, a motion sensor module for detecting motion of the portable terminal 100, and any other similar and/or suitable constituent elements that may be included in the portable terminal 100. Since the constituent elements may be variously changed according to a convergence trend of a digital device, not all elements can be listed. However, the portable terminal 100 according to the present exemplary embodiment may further include constituent elements equivalent to the foregoing structural elements.

Figure 2:
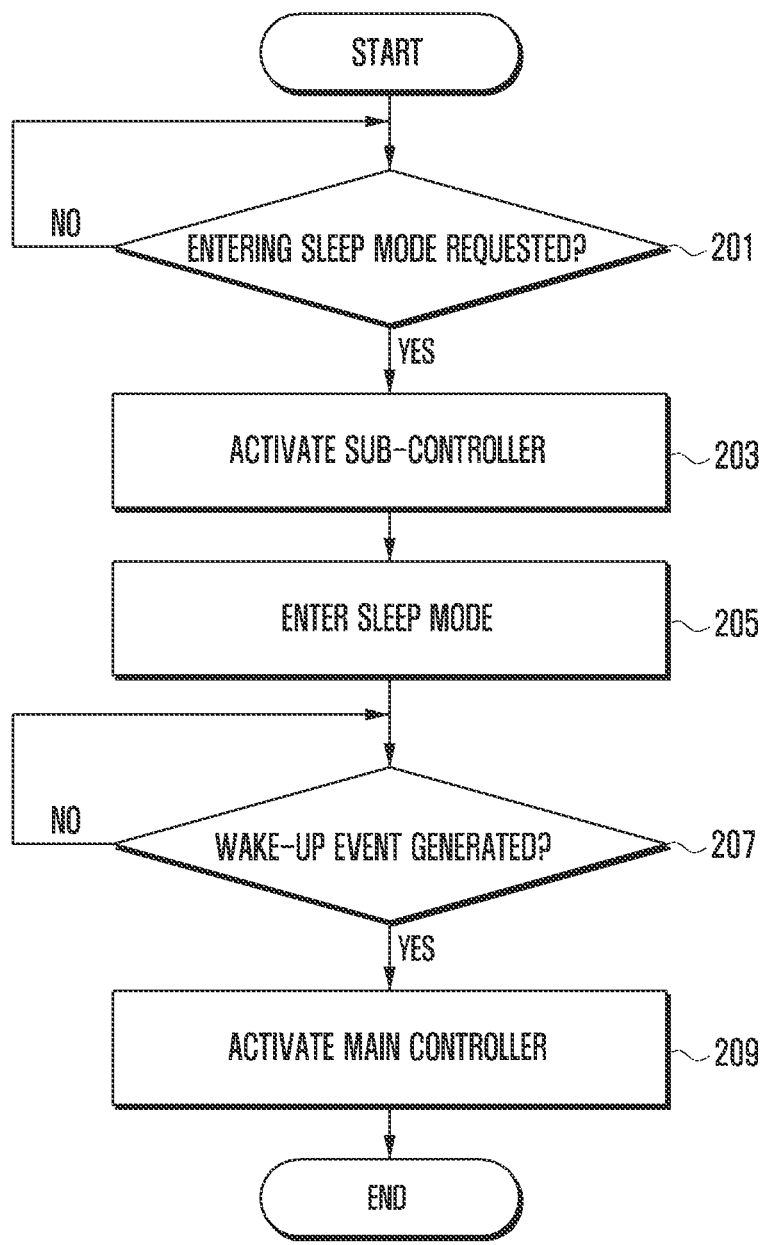
FIG. 2 is a flowchart illustrating a method of controlling a sleep mode of a portable terminal according to an exemplary embodiment of the present invention.

FIG. 2 is a flowchart illustrating a method of controlling a sleep mode of a portable terminal according to an exemplary embodiment of the present invention.

Referring to FIGS. 1 and 2, a main controller 110 according to an exemplary embodiment of the present invention may determine whether entering a sleep mode is requested in step 201. The entering of the sleep mode may be requested when there is no signal input for a predetermined time or longer or when a function key (e.g., power key) signal requesting the sleep mode is input.

When the entering of a sleep mode is not requested, the main controller 110 may maintain step 201. In this case, the main controller 110 may perform a music playback function, an Internet playback function, an Internet connection function, and a photographing function, or any other similar and/or suitable function according to a request of the user. Conversely, when the entering a sleep mode is requested, the main controller 110 may activate the sub-controller 190 in step 203, and may then enter the sleep mode in step 205. Meanwhile, the main controller 110 may transmit a motion wake-up pattern, a sound wake-up pattern, and an alarm condition to the sub-controller 190 in step 203.

Next, the sub-controller 190 may determine whether a wake-up event is generated in step 207. The wake-up event may be generated according to at least one of a motion input having a defined pattern, a sound input, and a sensor signal input meeting various conditions. A detailed description thereof will be described with reference to FIGS. 3 to 5. When a wake-up event cancelling the sleep mode is not generated at step 207, then the sub-controller 110 may maintain step 207. That is, the portable terminal 100 may maintain the sleep mode if the wake-up event cancelling the sleep mode is not generated at step 207. Conversely, when the wake-up event is generated, then the sub-controller 190 may activate the main controller 110 in step 209. That is, the sub-controller 190 may transmit a wake-up signal to the main controller 110. In this case, the wake-up signal may be an interrupt signal. Meanwhile, when the main controller 110 is woken-up so that the sleep mode is cancelled, the sub-controller 190 may be inactivated.

The foregoing exemplary embodiment illustrates a method of controlling the sleep mode in a portable terminal. Hereinafter, various exemplary embodiments with respect to the method of controlling a sleep mode in the portable terminal according to the present exemplary embodiments will be described with reference to FIGS. 3 to 5. In detail, an exemplary embodiment cancelling a sleep mode through movement or motion detection by the camera 180, another exemplary embodiment cancelling the sleep mode through sound recognition by the second microphone MIC2, and yet another exemplary embodiment cancelling a sleep mode through sensor information collected by the sensor 150, will be separately described. However, the present invention is not limited to the above noted exemplary embodiments.

Figure 3:
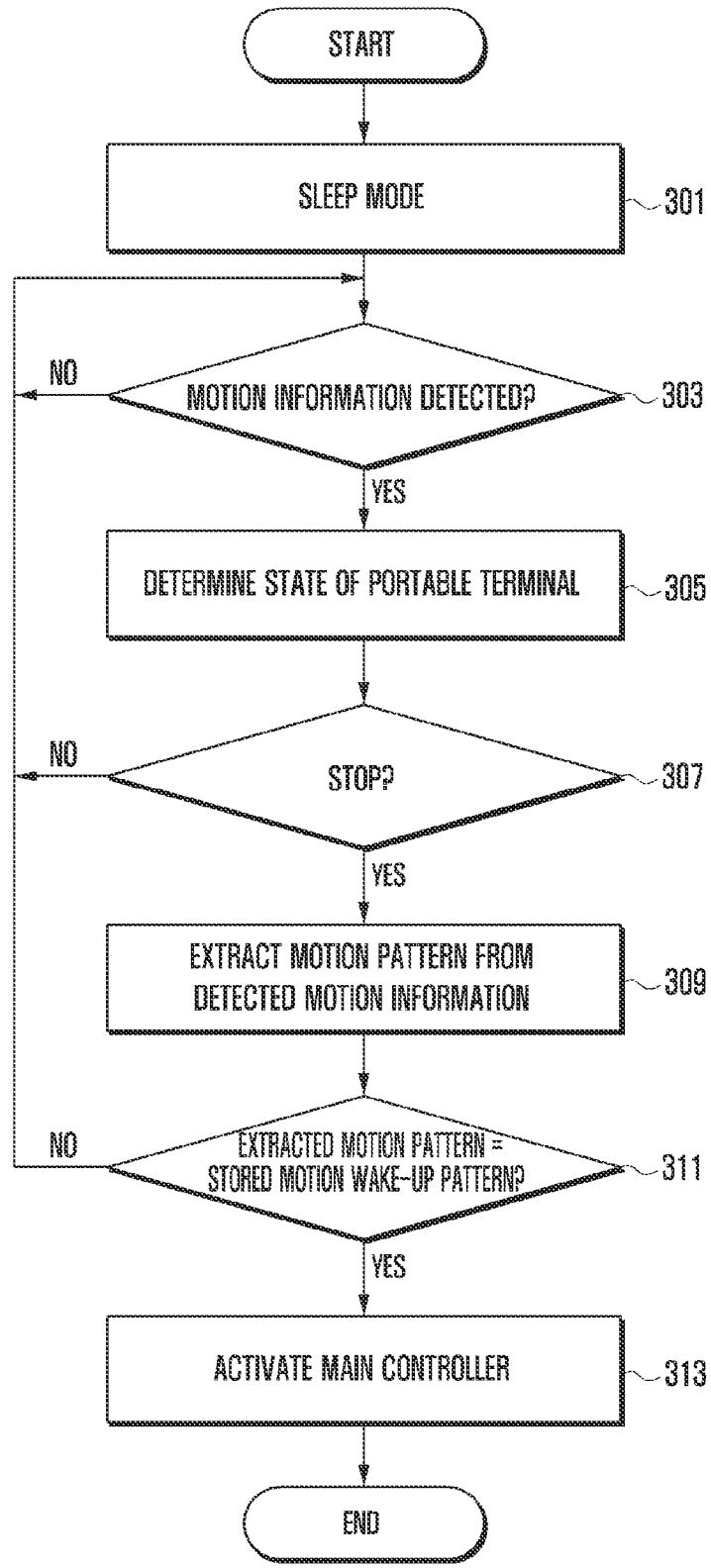
FIG. 3 is a flowchart illustrating a method of controlling a sleep mode of a portable terminal by detecting a motion signal according to an exemplary embodiment of the present invention.

FIG. 3 is a flowchart illustrating a method of controlling a sleep mode of a portable terminal by detecting a motion signal according to an exemplary embodiment of the present invention.

Referring to FIGS. 1 and 3, the portable terminal 100 according to the present exemplary embodiment may operate in a sleep mode in step 301. That is, instead of the main controller 110 having high current consumption, the sub-controller 190 having lower current consumption monitors generation of a wake-up event for requesting cancellation of the sleep mode.

The sub-controller 190 may determine whether motion information is detected in step 303. To this end, when the portable terminal enters the sleep mode, the camera 180 may be activated. Meanwhile, in order to reduce current consumption in the sleep mode, the camera 180 may not always be turned-on but may be turned-on according to a predetermined period. In addition, in order to minimize the current consumption, the camera 180 may activate only some pixels. For example, the camera 180 may activate only ⅟₁₀₀ or ⅟₁₀₀₀ of total of two million pixels included in the camera 180. The number of pixels of the camera 180 activated in the sleep mode may be determined by considering a minimum number of pixels capable of identifying motion of the user, an interface speed between the sub-controller 190 and the camera 180, and a current consumption according to the number of some pixels to be activated.

When the motion information is not detected at step 303, then the sub-controller 190 may maintain step 303. That is, the portable terminal 100 may maintain the sleep mode, and the sub-controller 190 may monitor generation of the wake-up event. Conversely, when the motion information is detected at step 303, then the sub-controller 190 may determine a state, e.g., a stopping of motion or movement of the portable terminal 100, in step 305. To this end, the sub-controller 190 may determine the state of the portable terminal 100 through at least one sensor, e.g., a gyroscope sensor, an acceleration sensor, a geomagnetic sensor, or any other suitable and/or similar sensor. The sub-controller 190, in step 307, may determine whether the portable terminal 100 is paused or is not moving based on a result of the state determined in step 305. Steps 305 and 307 are performed in order to prevent erroneous recognition of motion of a subject that is detected due to motion of the portable terminal 100 in a state in which the subject is fixed.

When the portable terminal 100 is not stopped in motion at step 307, then the sub-controller 190 may return to step 303 and repeat the foregoing procedures. Conversely, when the portable terminal 100 is stopped in motion at step 307, then the sub-controller 190 may extract a motion pattern from the detected motion information in step 309. To this end, it is preferable that the sub-controller 190 includes a pattern extraction function.

It will be appreciated that the motion or movement of the portable terminal 100 is a relative concept. For example, a stopping of motion may not require the portable terminal 100 to be stationary in the sense that it is currently not passing through space in any sense. The portable terminal 100 may still be rotating with the spin of the Earth, or, perhaps more pertinently, moving with a user who may themselves be moving, for example by some means of transportation. Here, the portable terminal 100 could be thought of as being stationary or substantially stationary with respect to the frame of reference of the user. In this instance if may be desirable for the described method to allow the sub-controller to extract a motion pattern as per step 309, and then proceed with the rest of the described method.

If the extraction of the motion pattern is completed, then the sub-controller 190 may determine whether the extracted motion pattern is identical or substantially identical, with a stored motion wake-up pattern in step 311, or otherwise compare the extracted motion pattern with the stored motion wake-up pattern. The results of this comparison may be used to determine whether the extracted motion pattern is identical or substantially identical with the stored motion wake-up pattern. To this end, the sub-controller 190 may store the motion wake-up pattern in an area which the sub-controller 190 may access. The sub-controller 190 may access the memory 120 that stores the motion wake-up pattern. Furthermore, the sub-controller 190 may compare the results of the comparison between the extracted motion pattern and the stored motion wake-up pattern to a predefined reference value, when determining whether or not the extracted motion pattern and the stored motion wake-up pattern are identical or substantially identical. Such a reference value may represent a required degree of correlation between the extracted motion pattern and the stored motion wake-up pattern.

When it is determined, in step 311, that the extracted motion pattern is not identical or substantially identical, with the motion wake-up pattern, then the sub-controller 190 may return to step 303 and repeat the foregoing procedures. Conversely, when the extracted motion pattern is identical or substantially identical with the stored motion wake-up pattern, then the sub-controller 190 may activate the main controller 110 in step 313. That is, the sub-controller 190 transmits the wake-up signal to the main controller 110 so that the main controller 110 is woken-up, thereby cancelling the sleep mode of the portable terminal 100. The wake-up signal may be an interrupt signal.

It will be appreciated that the detected motion or motion information may be thought of more fundamentally as a visual signal. A motion signal detected by the camera 180 must correspond to some manner of visual stimulus. Accordingly, a sensed pattern may be extracted from the detected visual signal, and the sensed pattern may then be compared to a preset wake-up pattern.

Figure 4:
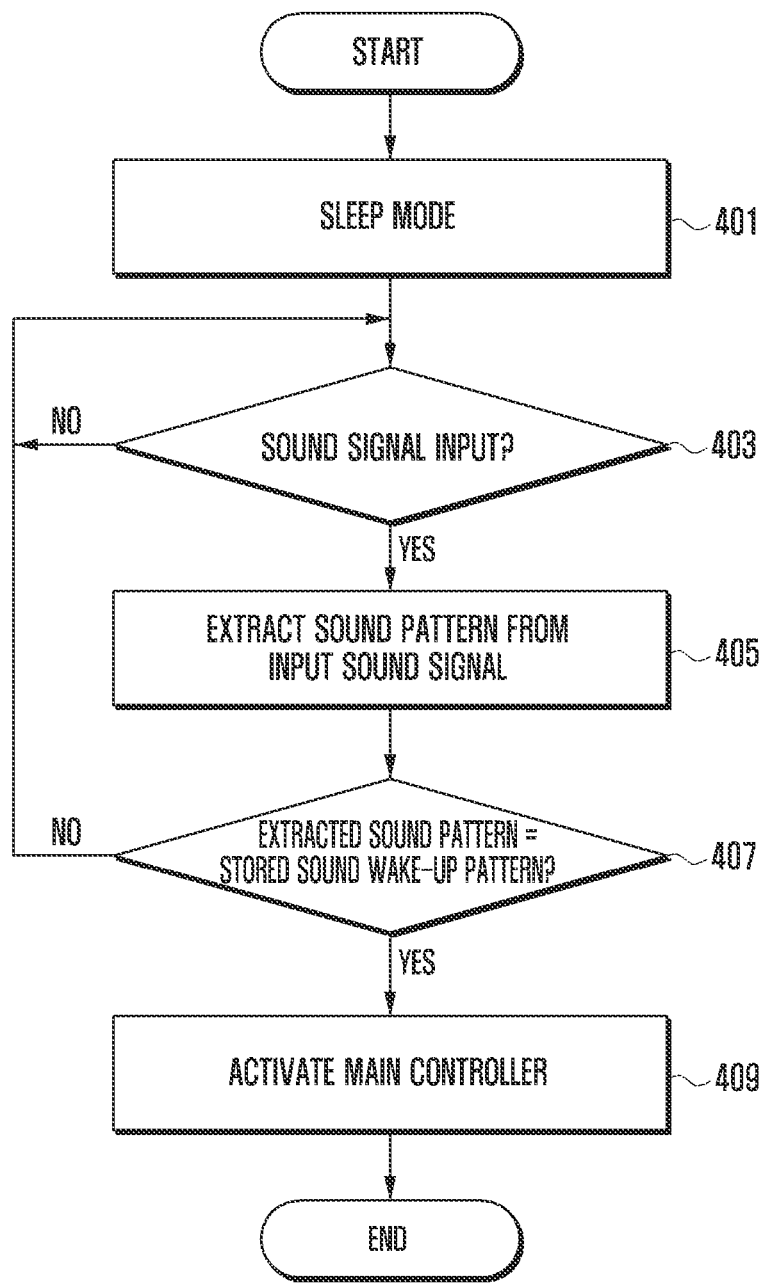
FIG. 4 is a flowchart illustrating a method of controlling a sleep mode of a portable terminal by detecting a sound signal according to an exemplary embodiment of the present invention.

FIG. 4 is a flowchart illustrating a method of controlling a sleep mode of a portable terminal by detecting a sound signal according to an exemplary embodiment of the present invention.

Referring to FIGS. 1 and 4, the portable terminal 100 according to the present exemplary embodiment may operate in a sleep mode in step 401. That is, the sub-controller 190 and a second microphone MIC2 are in an active state.

The sub-controller 190 may determine whether a sound signal is input through the second microphone MIC2 in step 403. When the sound signal is not input, then the sub-controller 190 may maintain step 403. Conversely, when the sound signal is input at step 403, then the sub-controller 190 may extract a sound pattern from the input sound signal in step 405. Since the extraction of the sound pattern is well known in the art of a sound recognition, a detailed description thereof is omitted.

If the extraction of the sound pattern is completed, the sub-controller 190 may determine whether the extracted sound pattern is identical or substantially identical with a stored sound wake-up pattern in step 407, or otherwise compare the extracted sound pattern with the stored sound wake-up pattern. The results of this comparison may be used to determine whether the extracted sound pattern is identical or substantially identical with the stored sound wake-up pattern. To this end, the sub-controller 190 may store the sound wake-up pattern in an area which the sub-controller 190 may access. The sub-controller 190 may access the memory 120 storing the sound wake-up pattern. Furthermore, the sub-controller 190 may compare the results of the comparison between the extracted sound pattern and the stored sound wake-up pattern to a predefined reference value, when determining whether or not the extracted sound pattern and the stored sound wake-up pattern are identical or substantially identical. Such a reference value may represent a required degree of correlation between the extracted motion pattern and the stored motion wake-up pattern.

When the extracted sound pattern is not identical or substantially identical with the sound wake-up pattern, then the sub-controller 190 may return to step 403 and repeat the foregoing procedures. Conversely when the extracted sound pattern is identical or substantially identical with the sound wake-up pattern, the sub-controller 190 may activate the main controller 110 in step 409. That is, the sub-controller 190 transmits the wake-up signal to the main controller 110 so that the sleep mode of the portable terminal 100 may be cancelled, i.e., so that the sleep mode of the portable terminal 100 may be terminated or exited. The wake-up signal may be an interrupt signal.

Figure 5:
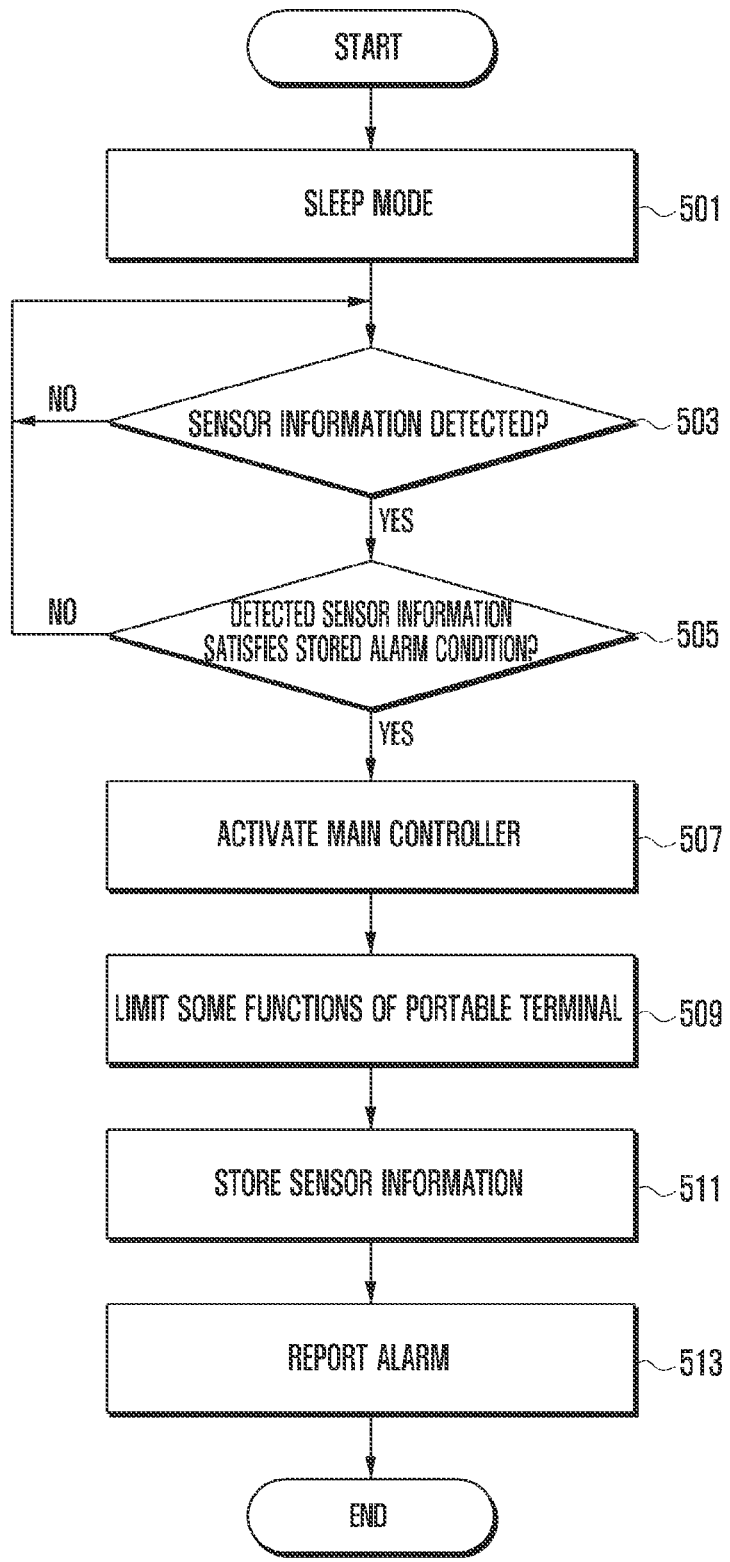
FIG. 5 is a flowchart illustrating a method of controlling a sleep mode of a portable terminal by detecting a sensor signal according to an exemplary embodiment of the present invention.

FIG. 5 is a flowchart illustrating a method of controlling a sleep mode of a portable terminal by detecting a sensor signal according to an exemplary embodiment of the present invention.

Referring to FIGS. 1 and 5, the portable terminal 100 according to the present exemplary embodiment may operate in a sleep mode in step 501. That is, the sub-controller 190 and a sensor 150 are in an active state. In this case, the sensor 150 transmits a sensing result to the sub-controller 190.

The sub-controller 190 may determine whether at least one sensor information is detected through the sensor 150 in step 503. When the sensor information is not detected at step 503, then the sub-controller 190 may maintain step 503. Conversely, when the sensor information is detected at step 503, then the sub-controller 190 may determine whether the detected sensor information satisfies a stored alarm condition in step 505. To this end, the sub-controller 190 may store the alarm condition. The sub-controller 190 may access to the memory 120 which stores the alarm condition. The alarm condition may be a reference value with respect to a situation where the portable terminal 100 may be damaged or the user may be in a dangerous situation and/or state with respect to the portable terminal 100. For example, the alarm condition may be a high temperature value, a low temperature value, a humidity value, a pressure value, an acceleration value, or any other similar and/or suitable value indicating a situation where the portable terminal 100 may be damaged or indicating that the user may be in a dangerous situation and/or state with respect to the portable terminal 100.

When it is determined, in step 505, that the sensor information does not satisfy the alarm condition, then the sub-controller 190 may return to step 503 and repeat the foregoing procedures. Conversely, when the sensor information satisfies the alarm condition, then the sub-controller 190 may activate the main controller 110 in step 507. That is, the sub-controller 190 transmits a wake-up signal to the main controller 110 so that the sleep mode of the portable terminal 100 may be cancelled, terminated, or exited. The wake-up signal may be an interrupt signal.

When the sleep mode is cancelled, the main controller 110 may limit some functions of the portable terminal 100 in step 509. For example, the main controller 110 may turn-off the display unit 130 or may reduce a brightness of the display unit 130 because current consumption of the display unit 130 is increased at a high temperature. As another example, the main controller 110 may stop charging of a battery at a high temperature because the battery may be in an unsafe state due to the possibility of explosion when the battery is charged at a high temperature. As another example, when free fall of the portable terminal 100 is detected, then the main controller 110 may drive an impact preventing circuit or block power. As another example, when the humidity is high, the main controller 110 may block the power in order to prevent the damage of a circuit due to inundation caused by the high humidity.

Next, the main controller 110 may store sensor information in step 511. The sensor information may be stored in an area which the user may not access, approach, or delete. An exact reason of failure of the portable terminal 100 may be detected through the stored sensor information during repair of the portable terminal 100. The main controller 110 may report an alarm reporting that some function of the portable terminal is restricted or reporting a dangerous situation in step 513. For example, the main controller 110 may display the alarm message on the display unit 130. The main controller 110 may output an alarm effect sound through the speaker SPK of the audio processor 160 and may additionally or separately generate a vibration or output any other similar and/or suitable notification of the alarm. Meanwhile, when the power of portable terminal 100 is blocked at step 509, the main controller 110 may report the alarm when the portable terminal 100 is turned on again.

In the above-described embodiments of the present invention a single suitable sensor signal and its corresponding extracted sensed pattern is disclosed as waking-up the main controller. However it should be appreciated that waking-up the main controller may require a combination of suitable sensor signals. For example, waking the main controller up may require that an extracted visual pattern and an extracted sound pattern are identical or substantially identical to a visual wake-up pattern and a sound wake-up pattern respectively. Alternatively a single pattern may be extracted from multiple sensor signals and compared to a wake-up pattern.

The foregoing method for controlling a sleep mode in a portable terminal of the present exemplary embodiments may be implemented in an executable program command form by various computer means and be recorded in a hardware device, such as a computer readable non-volatile recording medium or other similar hardware device. In this case, the computer readable non-volatile recording medium may include a program command, a data file, and a data structure individually or a combination thereof. In the meantime, the program command recorded in a recording medium may be specially designed or configured for the present exemplary embodiments or may be known to a person having ordinary skill in a computer software field to be used. The computer readable non-volatile recording medium includes magnetic media, such as a hard disk, a floppy disk, a magnetic tape, optical media such as a Compact Disc Read Only Memory (CD-ROM) or Digital Versatile Disc (DVD), a Magneto-Optical Media such as floptical disk, and a hardware device such as a Read Only Memory (ROM), a Random Access Memory (RAM), a flash memory storing and executing program commands. Further, the program command may include a machine language code created by a complier and a high-level language code executable by a computer using an interpreter. The foregoing hardware device may be configured to be operated as at least one software module to perform an operation described.

As mentioned above, the method and the apparatus for controlling a sleep mode in a portable terminal according to the exemplary embodiments of the present invention may activate a low power processor when the portable terminal enters the sleep mode, and may monitor a wake-up event for cancelling the sleep mode through the low power processor. Accordingly, the exemplary embodiments of the present invention may reduce current consumption, or power consumption, of a portable terminal. Further, since the exemplary embodiments of the present invention are configured in such a manner that the low power processor processes a signal input from the camera, the microphone, and the sensor including a plurality of sensors, the current consumption in the sleep mode may be reduced. Particularly, the exemplary embodiments of the present invention may activate only some pixels of the camera in the sleep mode, and may connect the camera to the low power processor through a low speed interface, thereby reducing the current consumption.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of controlling a sleep mode in a portable terminal, the method comprising:
   detecting, by a sub-controller, a first sensor signal generated by a first sensor when a main controller is in the sleep mode, the first sensor comprising a camera and the first sensor signal comprising a visual signal;
   extracting a sensed pattern from the detected first sensor signal;
   determining whether the extracted sensed pattern is substantially identical with a preset wake-up pattern; and
   cancelling the sleep mode by waking-up the main controller based on the extracted sensed pattern detected by the camera being substantially identical with the wake-up pattern, when the portable terminal is not moving,
   wherein the sub-controller is further configured to determine whether the portable terminal is moving when detecting the visual signal,
   wherein the sub-controller is further configured to extract the visual pattern from the detected visual signal when the portable terminal is not moving,
   wherein the sensed pattern comprises a visual pattern and the wake-up pattern comprises a visual wake-up pattern,
   wherein some pixels included in the camera are configured to be activated in the sleep mode and the camera is connected to the sub-controller through a low speed interface,
   wherein the sub-controller, connected to the first sensor employing a first resolution, extracts the sensed pattern, and wakes up the main controller if the extracted sensed pattern is identical with the preset wake-up pattern,
   wherein the main controller turns on a display and employs a second resolution of the first sensor, if the extracted sensed pattern is identical with the preset wake-up pattern,
   wherein the first resolution is lower than the second resolution, and
   wherein in response to the sleep mode changing to the wake-up due to the detection of a predetermined situation of the portable terminal, the main controller limits some functions of the portable terminal or turns off power of the portable terminal.

2. The method of claim 1, wherein the extracting of the visual pattern from the detected motion signal comprises:
   determining whether the portable terminal is moving when the visual signal is detected; and
   extracting the visual pattern from the visual signal when the portable terminal is not moving.

3. The method of claim 1, wherein the detecting, by the sub-controller, of the visual signal generated by the camera comprises detecting the visual signal by using only some pixels included in the camera.

4. The method of claim 1, wherein the first sensor comprises a microphone, the first sensor signal comprises a sound signal, the sensed pattern comprises a sound pattern and the wake-up pattern comprises a sound wake-up pattern.

5. The method of claim 4, wherein the extracting of the sensed pattern from the detected first sensor signal comprises:
   converting an analog signal input from the microphone into a digital signal; and
   extracting the sound pattern by analyzing the digital signal.

6. The method of claim 1, further comprising:
   receiving a second sensor signal by the sub-controller;
   determining whether the received second sensor signal satisfies a preset alarm condition;
   cancelling the sleep mode by waking-up the main controller when the alarm condition is satisfied; and
   limiting some of functions of the portable terminal when the alarm condition is satisfied.

7. The method of claim 6, further comprising reporting an alarm notifying that some functions of the portable terminal are limited.

8. The method of claim 6, further comprising storing the received second sensor signal in a protected area which a user is not able to access or delete.

9. An apparatus for controlling a sleep mode in a portable terminal, the apparatus comprising;
   a main controller configured to request entering the sleep mode;
   a first sensor configured to detect a first sensor signal when the main controller is in the sleep mode, the first sensor comprising a camera and the first sensor signal comprising a visual signal; and
   a sub-controller configured to:
   be activated to extract a sensed pattern from the first sensor signal detected by the first sensor when the main controller is in the sleep mode, and
   wake-up the main controller based on the extracted sensed pattern detected by the camera being substantially identical with a preset wake-up pattern, when the portable terminal is not moving,
   wherein the sub-controller is further configured to determine whether the portable terminal is moving when detecting the visual signal,
   wherein the sub-controller is further configured to extract the visual pattern from the detected visual signal when the portable terminal is not moving,
   wherein the sensed pattern comprises a visual pattern, and the wake-up pattern comprises a visual wake-up pattern, wherein some pixels included in the camera are configured to be activated in the sleep mode and the camera is connected to the sub-controller through a low speed interface, wherein the sub-controller, connected to the first sensor employing a first resolution, extracts the sensed pattern, and wakes up the main controller if the extracted sensed pattern is identical with the preset wake-up pattern, wherein the main controller turns on a display and employs a second resolution of the first sensor, if the extracted sensed pattern is identical with the preset wake-up pattern, wherein the first resolution is lower than the second resolution, and wherein in response to the sleep mode changing to the wake-up due to the detection of a predetermined situation of the portable terminal, the main controller limits some functions of the portable terminal or turns off power of the portable terminal.

10. The apparatus of claim 9, wherein the first sensor comprises a microphone, the first sensor signal comprises a sound signal, the sensed pattern comprises a sound pattern and the wake-up pattern comprises a sound wake-up pattern.

11. The apparatus of claim 10, wherein the sub-controller further comprises an analog-digital converter configured to convert an analog signal corresponding to the sound signal received from the microphone into a digital signal.

12. The apparatus of claim 9, further comprising:
a second sensor configured to:
be activated in the sleep mode, and
sense a surrounding situation and a state of the portable terminal, wherein the sub-controller is further configured to wake-up the main controller when the surrounding situation or the state of the portable terminal sensed through the second sensor satisfies a preset alarm condition, and wherein the main controller is further configured to limit some functions of the portable terminal when the preset alarm condition is satisfied.

13. The apparatus of claim 12, wherein the second sensor comprises at least one of an accelerometer sensor, a motion sensor, a geomagnetic sensor, a temperature sensor, a humidity sensor, an atmospheric sensor, a pressure sensor, a gravity sensor, and a vision sensor.

14. The apparatus of claim 12, wherein the main controller is further configured to report an alarm notifying that some functions of the portable terminal are limited.

15. The apparatus of claim 12, wherein the main controller is further configured to store sensor information sensed by the second sensor in a protected area which the user is not able to access or delete when the preset alarm condition to wake-up the main controller is satisfied.

16. A method of controlling a sleep mode in a portable terminal, the method comprising:

activating the sub-controller when the main controller enters the sleep mode;

continuously collecting, by the sub-controller, sensor information generated by a camera for at least one of surrounding situation information of the portable terminal and state information of the portable terminal;

determining whether the collected sensor information generated by the camera satisfies a preset alarm condition;

waking-up the main controller when the alarm condition is satisfied based on the camera generated sensor information;

limiting some functions of the portable terminal; and storing the collected sensor information in a protected area which a user is not able to access or delete, wherein the sub-controller is further configured to determine whether the portable terminal is moving when detecting the visual signal, wherein the sub-controller is further configured to extract the visual pattern from the detected visual signal when the portable terminal is not moving, wherein the sensor information comprises a visual signal, a visual pattern, and a visual wake-up pattern, wherein some pixels included in the camera are configured to be activated in the sleep mode and the camera is connected to the sub-controller through a low speed interface, wherein the sub-controller, connected to the first sensor employing a first resolution, extracts the sensed pattern, and wakes up the main controller if the extracted sensed pattern is identical with the preset wake-up pattern, wherein the main controller turns on a display and employs a second resolution of the first sensor, if the extracted sensed pattern is identical with the preset wake-up pattern, wherein the first resolution is lower than the second resolution, and wherein in response to the sleep mode changing to the wake-up due to the detection of a predetermined situation of the portable terminal, the main controller limits some functions of the portable terminal or turns off power of the portable terminal.

* * * * *